US009715336B2

(12) United States Patent
Topakas et al.

(10) Patent No.: US 9,715,336 B2
(45) Date of Patent: Jul. 25, 2017

(54) DIGITAL ART SYSTEMS AND METHODS

(71) Applicant: ART.COM, INC., Emeryville, CA (US)

(72) Inventors: Nasos Topakas, San Ramon, CA (US); Paul Golding, Cupertino, CA (US)

(73) Assignee: ART.COM, INC., Emeryville, CA (US)

( * ) Notice: Subject to any disclaimer, the term of this patent is extended or adjusted under 35 U.S.C. 154(b) by 369 days.

(21) Appl. No.: 14/639,880

(22) Filed: Mar. 5, 2015

(65) Prior Publication Data
US 2015/0177960 A1      Jun. 25, 2015

Related U.S. Application Data

(63) Continuation-in-part of application No. 14/030,913, filed on Sep. 18, 2013, now Pat. No. 9,292,162.
(Continued)

(51) Int. Cl.
*G06F 17/00* (2006.01)
*G06F 3/0484* (2013.01)
*G09G 3/32* (2016.01)
*G06F 17/30* (2006.01)
*G06F 3/0481* (2013.01)
(Continued)

(52) U.S. Cl.
CPC ...... *G06F 3/04842* (2013.01); *G06F 3/04815* (2013.01); *G06F 17/30247* (2013.01); *G06F 17/30265* (2013.01); *G06K 9/00604* (2013.01); *G06Q 30/0631* (2013.01);
(Continued)

(58) Field of Classification Search
CPC ......... G06F 17/30247; G06F 17/30265; G06F 3/04815; G06F 3/017; G06F 3/04842
See application file for complete search history.

(56) References Cited

U.S. PATENT DOCUMENTS

2012/0231424 A1* 9/2012 Calman ................. G09B 25/04
434/72
2013/0326381 A1  12/2013 Pereira et al.
(Continued)

OTHER PUBLICATIONS

Non-Final Office Action Mailed May 10, 2017 in U.S. Appl. No. 14/639,844 of Topakas et al. filed Mar. 5, 2015, 13 pages.

*Primary Examiner* — Truong Vo
(74) *Attorney, Agent, or Firm* — Perkins Coie LLP

(57) ABSTRACT

Disclosed here are methods, devices, paradigms and structures for creating, displaying and facilitating the selection of art, design and décor. A digital art device ("device") facilitates creating and displaying a digital art in accordance with the relationship to a viewer. The device can include sensors such as cameras, gyroscopes, audio processor, photometer, eye-tracking sensors, etc., to identify various types of human interaction, and the environment around the device. The device displays, adapts, or transforms the digital art according to the observed human interaction and/or surroundings of the device. Tools will allow developers to create new applications for displaying and creating digital art to be viewed on the device. Developers can access underlying décor discovery and visualization tools to process color, style and other décor-related attributes. The capabilities of the device and the décor discovery and visualization tools can be exposed as new functions in the applications created for the device.

32 Claims, 15 Drawing Sheets

Related U.S. Application Data

(60) Provisional application No. 61/824,967, filed on May 17, 2013, provisional application No. 61/809,802, filed on Apr. 8, 2013, provisional application No. 61/809,832, filed on Apr. 8, 2013.

(51) Int. Cl.
*G06Q 30/06* (2012.01)
*G06Q 50/10* (2012.01)
*G06K 9/00* (2006.01)

(52) U.S. Cl.
CPC ............ *G06Q 50/10* (2013.01); *G09G 3/32* (2013.01); *G06K 9/00892* (2013.01)

(56) References Cited

U.S. PATENT DOCUMENTS

2015/0178315 A1  6/2015  Topakas et al.
2015/0178955 A1  6/2015  Topakas et al.

\* cited by examiner

DIGITAL ART SYSTEMS AND METHODS

CROSS-REFERENCE TO RELATED APPLICATIONS

This application is a continuation in part of U.S. application Ser. No. 14/030,913 titled "DISCOVERING AND PRESENTING DECOR HARMONIZED WITH A DECOR STYLE" filed Sep. 18, 2013, which claims the benefit of U.S. Provisional Application Ser. Nos. 61/824,967 titled "DISCOVERING, VISUALIZING AND FACILITATING THE SELECTION OF ART, DESIGN, AND DECOR" filed May 17, 2013, 61/809,802 titled "DIGITAL ART SYSTEMS AND METHODS" filed Apr. 8, 2013, and 61/809,832 titled "DISCOVERING, VISUALIZING AND FACILITATING THE SELECTION OF ART, DESIGN, AND DECOR" filed Apr. 8, 2013; all of which are incorporated herein by reference for all purposes in their entirety.

BACKGROUND

Artists have used canvas, oils or similar materials for image creation. Their art has remained within the confines of those tools. The tools have historically been one way tools, like books. The creator does not have a relationship with the viewer. The creator doesn't even know who the user is. The creator does not have tools to create images that match with a personality, mood, etc., of a user. Further, current digital art devices show digital facsimiles of existing artwork, for example, created for canvas or other non-digital media. The user interaction with such art is limited to zooming in, zooming out, changing orientation, etc. Also, the digital installation itself which is typically a screen or a display device, is not an art. Further, the current tools lack abilities to create, search, or suggest an art based on room décor, mood of a person, etc.

BRIEF DESCRIPTION OF THE DRAWINGS

One or more embodiments of the disclosed techniques are illustrated by way of example and not limitation in the figures of the accompanying drawings, in which like references indicate similar elements.

DETAILED DESCRIPTION

Figure 1:
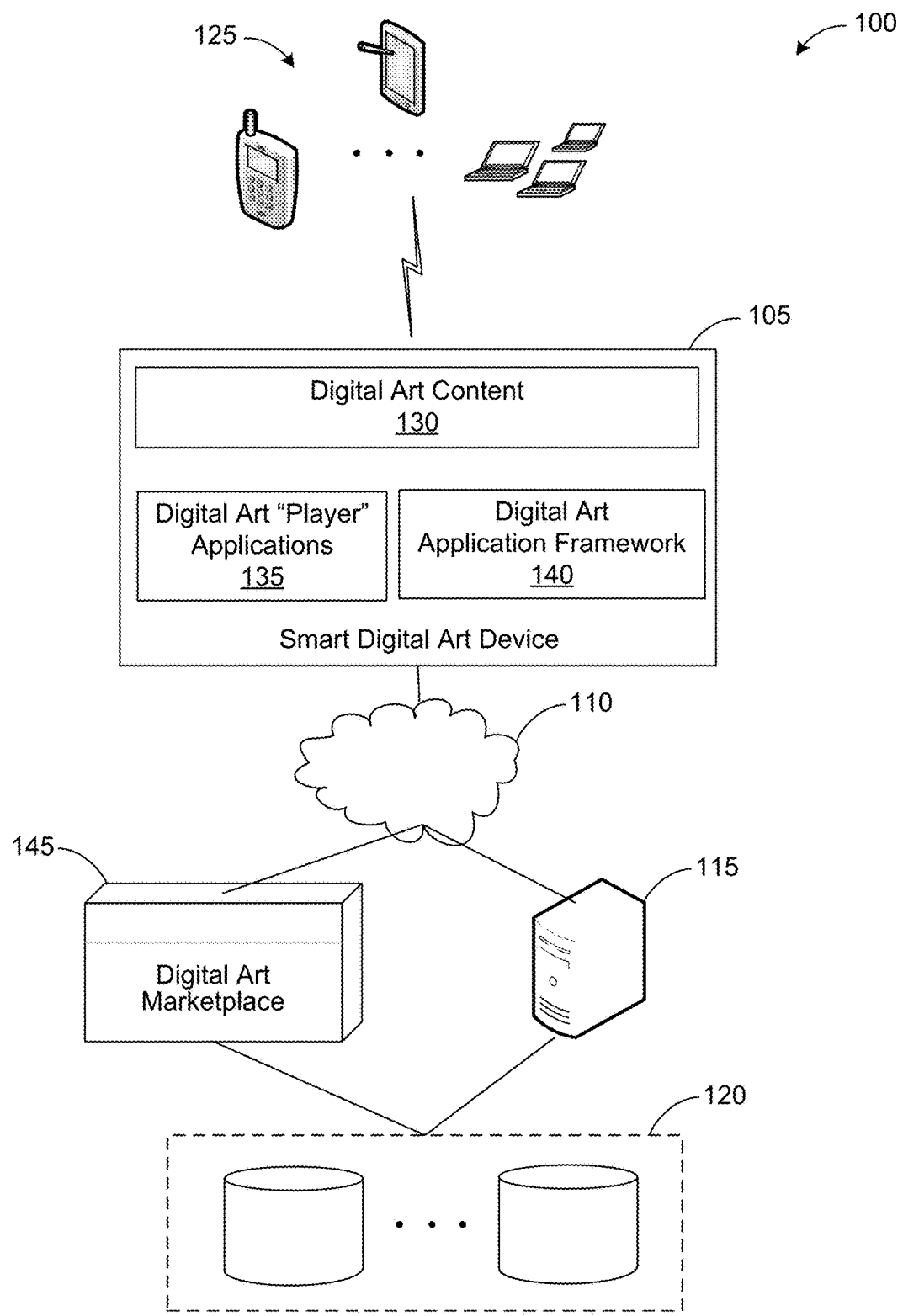
FIG. 1 is an example of an environment in which a smart digital art device may operate.

Disclosed here are methods, systems, paradigms and structures for creating, displaying and facilitating the selection of art, design and décor. At least one embodiment of the invention includes a smart digital art device (also referred to as "art installation," "digital art device," or "device") for displaying art such as a digital art (also referred to as "art media") to a viewer. In some embodiments, a digital art is an art work that is electronically generated, and includes various representations or states which are displayed in response to events. The digital art device includes various sensors such as camera, gyroscopes, microphone, audio processor, photometer, eye-tracking sensors, etc., to identify various types of human interaction, and to identify various attributes of a setting or an environment where the art installation is installed. A digital art displayed in the device can be transformed in accordance with the relationship to a viewer or the setting. That is, the digital art device can process, change, adapt, display or transform the digital art according to the observed human interaction and/or the observed attributes of the setting. The digital art can be associated with various events, each of which can trigger one or more actions upon an occurrence of a particular event. The digital art device can process the input received from various sensors, generate events and process and/or display the digital art based on the actions associated with the events.

For example, when a digital art device displaying a digital art depicting some fruits placed on a table, is tilted or rotated to change the orientation of the digital art device, the digital art is processed or transformed to another representation that depicts the table being tilted and fruits rolling down the table in response to an orientation event. The digital art can be a collection of various related multimedia files, e.g., image files, that form various representations of the digital art, or can be a single file that can be programmed to include different representations. Continuing with the above example of the digital art depicting fruits placed on a table, the digital art depicting the table and the fruits in a first orientation of the digital art device can be a first representation of the digital art, and the digital art depicting the table and the fruits in a second orientation of the digital art device can be a second representation of the digital art.

In some embodiments, transforming the digital art includes generating a second representation of the digital art from a first representation of the digital art, e.g., in response to an event. The different representations of the digital art can be separate multimedia files, e.g., image files, or can be part of a single file. The artist might have created a single digital art to depict the states or representation of the digital art at both orientations. For example, if the artist has generated the digital art using CGI techniques, the digital art in a state of the first orientation can be programmed to transform to a state of that of the second orientation upon the occurrence of an orientation change event.

In some embodiments, transforming the digital art includes generating a second digital art that is different from that of the first digital art, e.g., in response to an event. In some embodiments, processing the digital art can include retrieving a new digital art from the storage system and displaying the new digital art. Continuing with the above example of the digital art depicting some fruits placed on the table, the digital art for the second orientation can be a digital art different from that of the first orientation, e.g., a digital art depicting a cup of coffee. That is, the artist can have created two different digital arts, one for the first orientation and another one for the second orientation.

The digital art device may also be used to display media of non-digital art, but the advantages obtained by exploiting the user interactions with the digital art may not be obtained with non-digital art. In some embodiments, a digital art is an art work that is electronically created as opposed to non-digital artwork that is an image of a manually created art work.

In some embodiments, the digital art can be associated with a number of events and actions that are triggered upon the occurrence of the events. A user, such as an artist, who creates the digital art, can define a set of events to be associated with the digital art and one or more actions to be triggered upon the occurrence of each of the set of events. For example, for a digital art depicting some fruits placed on a table, the artist can define an event, such as an orientation event which occurs upon a change in orientation of the digital art device, and can define an associated action to transform the digital art to a particular representation that tilts the table or moves or rolls some of the fruits to a corner of the table when the orientation event occurs.

The digital art device can be an electronic display that enables the digital art to be displayed for the purposes of wall décoration. The digital art device can include, for example, e-paper that is not restricted to be flat or rectangular, can be made from materials or combination of materials such as e-paper laminated by transparent light emitting diode (LED) matrices, etc. Further, the digital art device itself can be designed to look like an art work. The digital art device can be integrated into other décor or construction materials, such as the wallpaper or wall panels (e.g. low cost LEDs glued close beneath the surface of a wall panel, sufficient to shine through the panel, which can be used for both art and lighting purposes). The digital art device can also include bio and chemical luminescence materials, that is, materials that can effuse light. The digital art device can also include a frame. In some embodiments, the frame can be made of e-paper; can also include bio and chemical luminescence materials, that is, materials that can effuse light. In some embodiments, a portion of the screen of the digital art device, e.g., all or some borders of the screen, may be configured to display media that appears like a frame of the digital art device.

A digital art software development kit (SDK) allows developers to create applications (a) that can be used by artists to create digital art to be viewed on the digital art device and (b) that can be used to display various types of digital art on the digital art device. The developers can access underlying décor discovery and visualization tools that are able to process color, style and other décor-related attributes. The capabilities of the digital art device and the décor discovery and visualization tools can be exposed as an application programming interface (API) in the applications created for the digital art device. In this way, developers can extend the types of digital art experiences that can be installed on and viewed via the digital art device. Users of the digital art device can download and install these applications on the digital art device in order to display new types of digital art media experiences.

Example Environment

FIG. 1 is an environment in which a digital art device may operate, according to an embodiment of the disclosed technique. The environment 100 includes the digital art device 105 that can be used to create and display digit art content 130 such as images. The device 105 includes a digital art application framework 140 that allows the user to load and run applications (also referred to as "app") such as digital art player app 135 for viewing digital art content 130 and controlling the user interface of the device 105. The digital art application framework 140 provides as a platform on which the applications can run on the device 105. The digital art player app 135 enables the user to browse digital art content 130 and applications, such as digital player apps, applications for creating the digital art, stored in a digital art marketplace 145 running on a remote server such as server 115. In some embodiments, some of the digital art content 130 can be stored at the database 120. In some embodiments, some of the applications can be stored at a local storage device associated with the digital art device 105.

For example, the digital art marketplace 145 can have a digital player app that enables a user to view digital "time-lapse" art. In some embodiments, a digital time-lapse art is an art that evolves slowly over time, such as a tree that grows from day to day, or changes with the seasons. To view the "time-lapse" art, the user may download the time-lapse app from the digital art marketplace 145. After the time-lapse app is installed on the digital art device 105, the user can use the time-lapse app to access app-specific (i.e. "time lapse") digital art content 130 in a content catalogue, such as a plurality of databases 120, associated with the digital art marketplace 145. Once the time-lapse app is downloaded to the digital art device 105 and installed, the device 105 could continue to access digital art content 130 directly from the database 120 in order to access content updates (e.g. time lapsed sequences downloaded periodically).

The digital art device 105 displays media based on a variety of user interactions and/or based on the characteristics of a setting, e.g., a room, where the digital art device 105 is installed. The user may interact with device 105 using a number of client devices 125 such as a smart phone, tablet computer, laptop, desktop, etc. The user may also interact with the device 105 using a touch screen of the device 105. The database 120 stores art works, user profiles that are used to personalize images, artist information, color palettes, etc. The server 115 acts as a gateway for communicating with the database 120. The server 115 also facilitates in performing searching of digital art, non-digital art, and can include software such as computer generated imagery (CGI) applications and various other plug-ins necessary for providing the above digital art experience to the user, e.g., creating digital art, playing digital art. Certain other software, including digital art player apps, digital art content creator apps, may also be downloaded from the digital art market place 155 to the device 105.

The device 105 communicates with the server 115 over a communication network 110. The communication network 110 includes wide area network (WAN), local area network (LAN), Internet, or such other similar networks. The connection between the device 105 and the communication network 110 and between server 115 and the communication network 110 can be wired or wireless.

Various content providers, e.g., artists, can download the digital art creation apps from the digital art marketplace 145 onto their user devices, e.g., a desktop, a laptop, a smart phone, a tablet pc, digital art device 105, and use the apps for creating the digital art. The artist can also define one or more events and associated actions for the digital art. An action defines a process to be performed upon an occurrence of an event. After creating the digital art, they can publish the digital art in the digital art marketplace 145. In some embodiments, the artists provide their digital arts to publishers who publish digital arts obtained from various artists to the digital art marketplace 145. The users can buy the digital arts from the digital art marketplace 145 for displaying at their digital art devices. Users can also subscribe to a particular artist and any updates from the artist, e.g., a new digital art published to the digital art marketplace 145, can be transmitted to the users, e.g., at their digital art devices.

Figure 2:
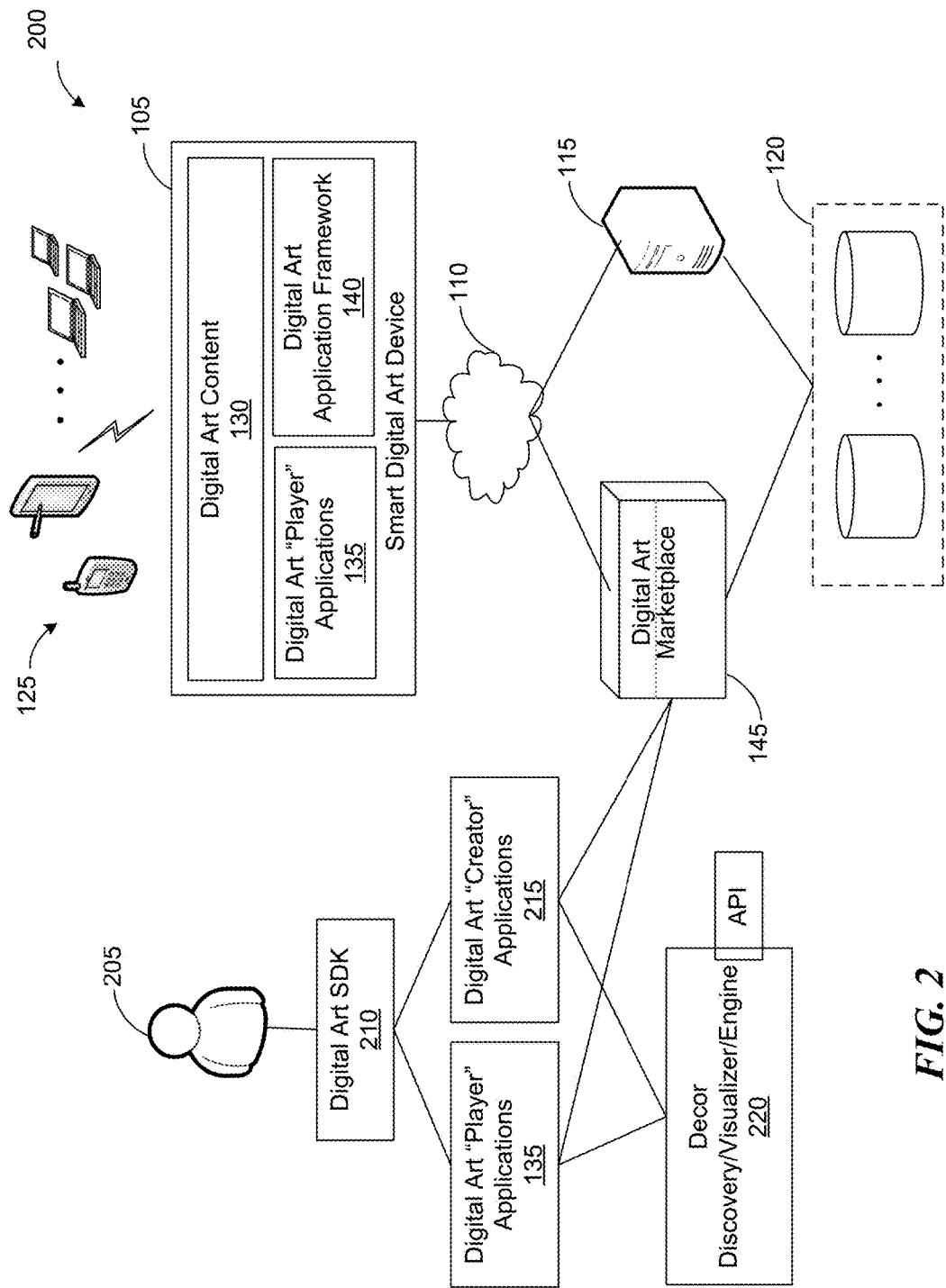
FIG. 2 is an example of an environment in which a digital art may be viewed or created on the smart digital art device, consistent with an embodiment of a disclosed technique.

FIG. 2 is an environment in which digital art content and digital art applications are created for a digital art device of FIG. 1, according to an embodiment of the disclosed technique. The environment 200 includes the digital art device 105 that can be used to create and display digit art content 130 such as images, and create other digital art applications for facilitating creation and display of digital art content 130.

A developer such as developer 205 can use a digital art SDK 210 to build applications such as digital art player apps 135 to view digital art content 130, digital art creator apps 215 to create digital art content 130, and any other apps that can run on the digital art device 105. The digital art SDK 210 allows the user to exploit full capabilities of the digital art device 105 so that the developer 205 can produce applications that enable the content producers, e.g., artists, to produce digital art content 130. For example, the developer 205 could develop an application that provides the tools for the artist to create time-lapse art.

Further, in an embodiment, using the digital art SDK 210, the developer 205 will also be able to access décor visualizer/engine/discovery tool 220. The décor visualizer/engine/discovery tool 220 will enable the apps to gain access to features that include the ability to discover, visualize and analyze décor items stored in databases, including digital art content 130. For example, the developer 205 can create an app that uses one of the sensors on the digital art device 105, e.g., a camera, to identify the colors in the room where the digital art device 105 is situated, to generate a color palette for the room. The décor engine 220 can then be used to find digital art content 130 that matches the color of the room. The apps can access the features of the décor visualizer/engine/discovery tool 220 using the API on the décor visualizer/engine/discovery tool 220. After creating the apps, the developer 205 submits the apps to the digital art marketplace 145. The apps are made available to the users upon approval by an entity managing the digital art marketplace 145.

Content creators, e.g., an artist, can use the available apps, e.g., digital art creator apps 215, from the digital art marketplace 145 to create content. The content creator can then upload the digital art content 130 to the digital art marketplace 145 which stores the digital art content 130 in the database 120. Upon approval by the entity managing the digital art marketplace 145, the digital art content 130 is made available to users to consume via the appropriate digital player art applications 135.

The digital art creator app 215 enables the artist or provides the artist with a set of tools to allow all of the features of the device 105 (which are described in additional detail at least with reference to FIGS. 6-13), such as eye-tracking, gesture control, sound matching, color-matching, face recognition, to be exploited during the digital creation process. In an embodiment, the tools can be provided as plug-ins or extensions which can be installed into existing digital creation software tools, such as the Adobe Creation Suite from Adobe of San Jose, Calif. However, in other embodiments, the tools may be developed as new software that can be installed on the device 105.

The user of the device 105 is given the option to "follow" artists so that any updates are automatically made available for showing on the device. This includes following the real-time construction of new digital arts so that a user can watch the construction from beginning to end at the same rate as the artist creates the digital art. The digital player apps 135 support "super slow-motion" updates that enable the artist to produce a digital art that changes very slowly (for example, over days, weeks or even months) so that the digital art evolves on the display and becomes a "living" work of art that generates anticipation for the user. This provides a way to achieve dynamic image capabilities for a display of the device 105, such as e-ink display, that has a relatively low refresh rate. This can also be a way to achieve dynamic images without consuming a lot of power.

Further, the digital art creator apps 215 can enable the artists to create, using particle physics, algorithms to control the "flow" of digital paint via the trajectory of paint particles, for example, spirals, splashes, swathes, trickle and so on. Different artists can construct libraries of different flow patterns. Users can subscribe to various complete pattern sets that represent a finished work by an artist, or they can combine different sets to create their own works. This allows unique abstract works to be created according to user preference and experimentation. The digital player apps 135 can then display digital arts that have these flow patterns on the digital art device 105.

Digital Art Device Architecture

Figure 3:
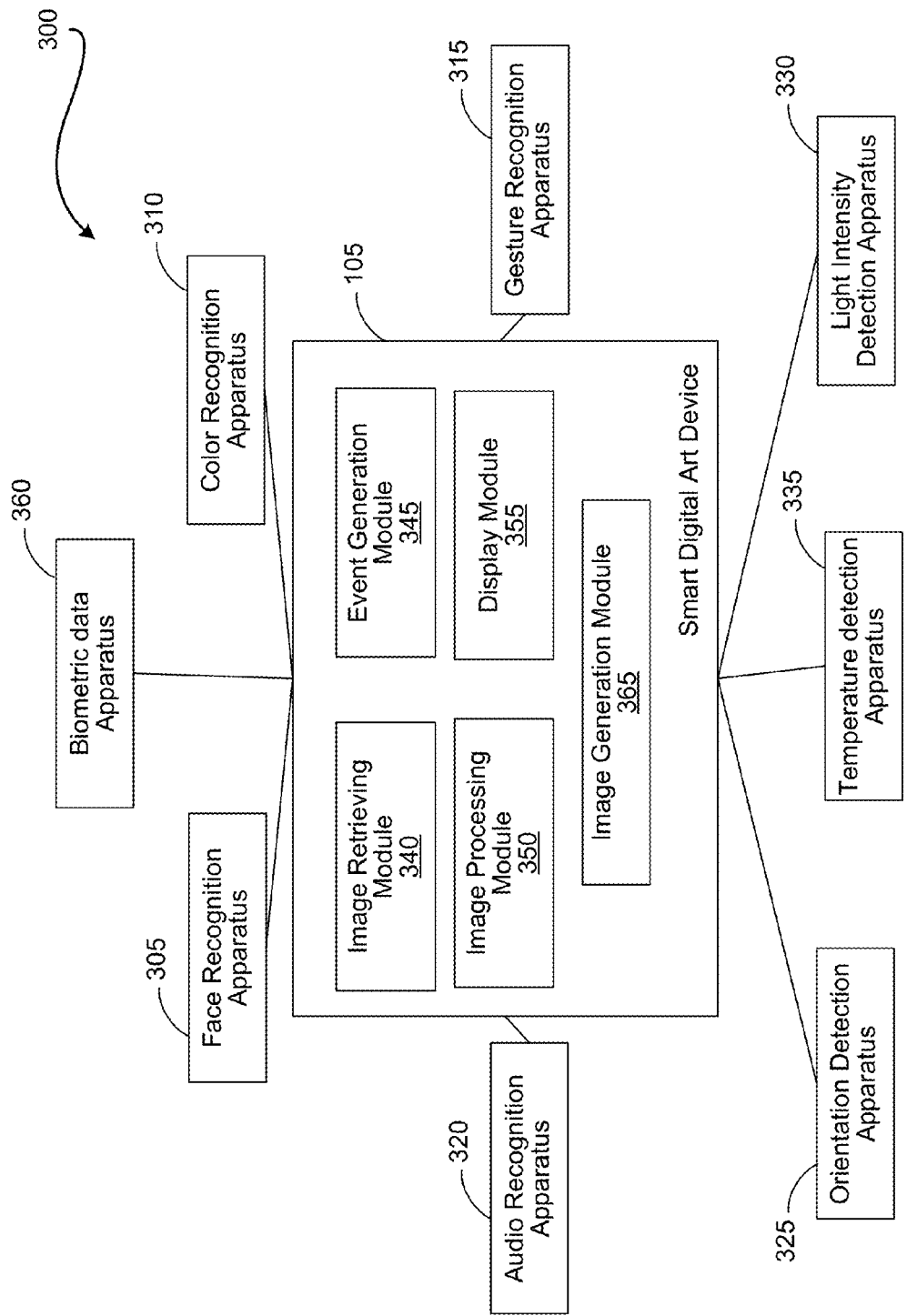
FIG. 3 is a block diagram of a high level architecture of the smart digital art device of FIG. 1, consistent with an embodiment of a disclosed technique.

FIG. 3 is a block diagram of the digital art device of FIG. 1, according to an embodiment of the disclosed technique. The digital art device 105 supports creating or displaying a digital art, e.g., digital art content 130, based on a number of user interaction features, features of the setting and/or features of the device. The digital art device 105 includes a number of sensors, e.g., a face recognition apparatus 305, a color-recognition apparatus 310, a gesture recognition apparatus 315, an audio recognition apparatus 320, an orientation detection apparatus 325, a light intensity detection apparatus 330, a temperature detection apparatus 335, for capturing various user interactions and attributes of the setting and/or the digital art device 105.

In some embodiments, the face recognition apparatus 305, color-recognition apparatus 310 and the gesture recognition apparatus 315 include one or more cameras. Further, in some embodiments, each of the face recognition apparatus 305, color-recognition apparatus 310 and the gesture recognition apparatus 315 have cameras of different configurations. In some embodiments, the light intensity detection apparatus 330 includes a photometer. In some embodiments, the orientation detection apparatus 325 includes a gyroscope. In some embodiments, the temperature detection apparatus 335 includes a thermometer.

The face recognition apparatus 305 can be used to recognize the person facing the device 105. The color-recognition apparatus 310 can be used to identify the color scheme of the room décor. The gesture recognition apparatus 315 can be used to identify the gestures made by the user facing the device 105. The audio recognition apparatus 320 can be used to identify the voice commands of the user or music, sound, ambient noise in the setting where the device 105 is installed. The orientation detection apparatus 325 can be used to determine the orientation of the device 105. The light intensity detection apparatus 330 can be used to determine the lighting conditions and levels in the setting where the device 105 is installed. The temperature detection apparatus 335 can be used to determine the temperature in the setting where the device 105 is installed. The device 105 uses the data received from one or more of the above sensors in displaying an appropriate digital art and/or in altering or transforming the digital art already displayed on the digital art device 105 to another digital art.

The device 105 includes an event generation module 345 that generates an event based on the data received from the sensors. For example, the event generation module 345 generates an orientation event when the orientation of the device 105 changes. In another example, the event generation module 345 generates a gesture control event when a user performs a gesture at the device 105.

The device 105 includes an image processing module 350 that processes the various events to perform the associated actions and generate the transformed digital arts. For example, for an orientation event, an artist-defined action can be to tilt a portion the digital art accordingly when the device is tilted. The image processing module 350 processes the digital art displayed in the device 105 to tilt the portion of the digital art, e.g., by retrieving a representation of the digital art containing the tilted portion or retrieving a new digital art that contains the tilted portion of the displayed digital art. The image processing module 350 communicates with the image retrieving module 340 to retrieve the new digital art and/or the representation containing the tilted portion, which can be stored in a storage system such as database 120, and notifies a display module 355 to display the transformed digital art. In another example, the user can perform a gesture to zoom a particular portion of the digital art displayed on the device 105. The event generation generates a gesture event and notifies the gesture to the image processing module 350. The image processing module 350 can then process the digital art to generate the transformed image, e.g., retrieve a representation of the digital art containing a zoomed-in view of the identified portion or obtain a new digital art to display the zoomed-in view. That is, the image processing module 350 facilitates obtaining of an appropriate image based on the user interactions, or properties of the device or the properties of the setting and displaying the image on the device 105. Additional details with respect to various features of the digital art device 105 and how the events are processed are described at least with reference to FIGS. 6-13 below.

The device 105 also includes an image generation module 365 that can be used to generate digital art. For example, the digital art creator app 215 can be implemented or executed using the image generation module 365. The image generation module 365 can also implement some or all portions of the digital art app framework 140.

Although the diagrams depict components as functionally separate, such depiction is merely for illustrative purposes. It will be apparent to those skilled in the art that the components portrayed in this figure can be arbitrarily combined or divided into separate components. Further, although the device is described with reference displaying or creating a digital art image, the device may also be used to create and display images of non-digital art. However, the advantages obtained by exploiting the user interactions with the digital art may not be obtained with non-digital art.

The digital art device 105 itself can be designed to look like an art work. The digital art device 105 is an electronic display that enables images to be displayed for the purposes of wall décoration. The digital art device 105 can include, for example, e-paper that is not restricted to be flat or rectangular, can be made from materials or combination of materials such as e-paper laminated by transparent LED matrices, etc. The digital art device 105 can be integrated into other décor or construction materials, such as the wallpaper or wall panels (e.g. low cost LEDs glued close beneath the surface of a wall panel, sufficient to shine through the panel, which can be used for both art and lighting purposes). The device 105 can also include bio and chemical luminescence materials, that is, materials that can effuse light.

The frame of the device 105 can also be made from a display material so that it can display different frame colors and textures on command, which could be used to match the frame to the surrounding décor or to the user's current tastes. The edge of the device contains a skirt of LED arrays that can project light onto the wall to enable the color of the image to "bleed" out to the surrounding décor.

The device 105 can include a replaceable and rechargeable battery that can be inserted into the side of the frame. The device 105 can be designed to be a portable device so that it can be removed from one place and installed in another place easily.

Figure 4:
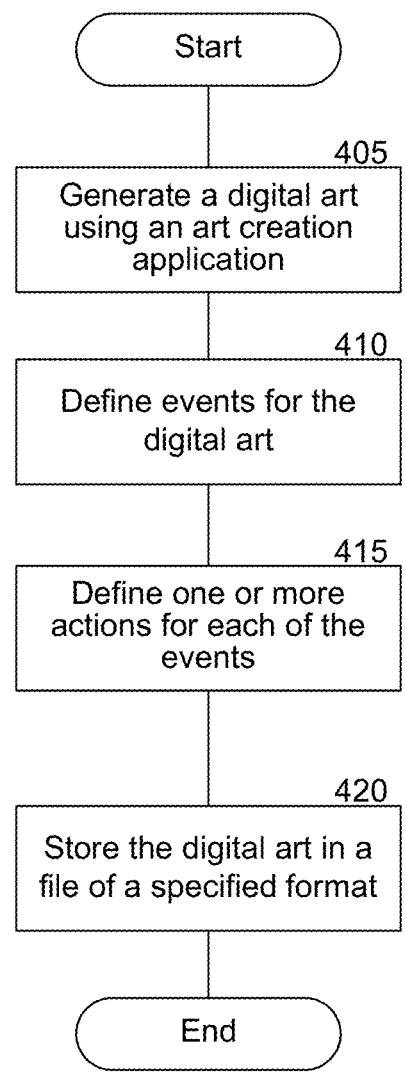
FIG. 4 is a flow diagram of a process for creating a digital art, consistent with an embodiment of a disclosed technique.

FIG. 4 is a flow diagram of a process 400 for creating a digital art consistent with an embodiment of a disclosed technique. The process 400 can be implemented in an environment 100 of FIG. 1. The process 400 can be executed at the digital art device 105 and/or other user devices, e.g., a desktop, a laptop, a tablet, etc. A content provider, e.g., an artist, can use a digital art creator application, e.g., digital art creator app 215 of FIG. 2 downloaded from the digital art marketplace 145 for creating a digital art. At block 405, the artist generates a digital art using the digital art creator app 215.

At block 410, the artist defines one or more events, e.g., a gesture control event, a face recognition event, an orientation event, an eye tracking event, etc., for the digital art. The digital art device 105 can generate these defined events based on the data received from the sensors.

At block 415, the artist can define one or more actions for each of the events. For example, an action for an orientation event for a particular digital art can be to tilt the digital art or a portion of the digital art based on the orientation. Additional details with respect to the orientation event and the action associated with the orientation event are described at least with reference to FIG. 13 below.

In some embodiments, some of the events and the actions can be defined by the digital art device 105 itself. For example, one of the predefined events can be to generate an event when an intensity of light in a setting where the digital art device 105 is installed drops below a threshold or exceeds a specified threshold and the associated action can be to increase or decrease a brightness of the screen accordingly. The predefined events can be customized, e.g., enabled, disabled, and modified, by the user of the digital art device 105.

After the digital art is generated, at block 420, the artist can save the digital art into a media file. The media file can be of a specific format, e.g., a format that can be displayed on the digital art device 105 using the digital art player apps 135. The media file can be published to the digital art marketplace 145.

Figure 5:
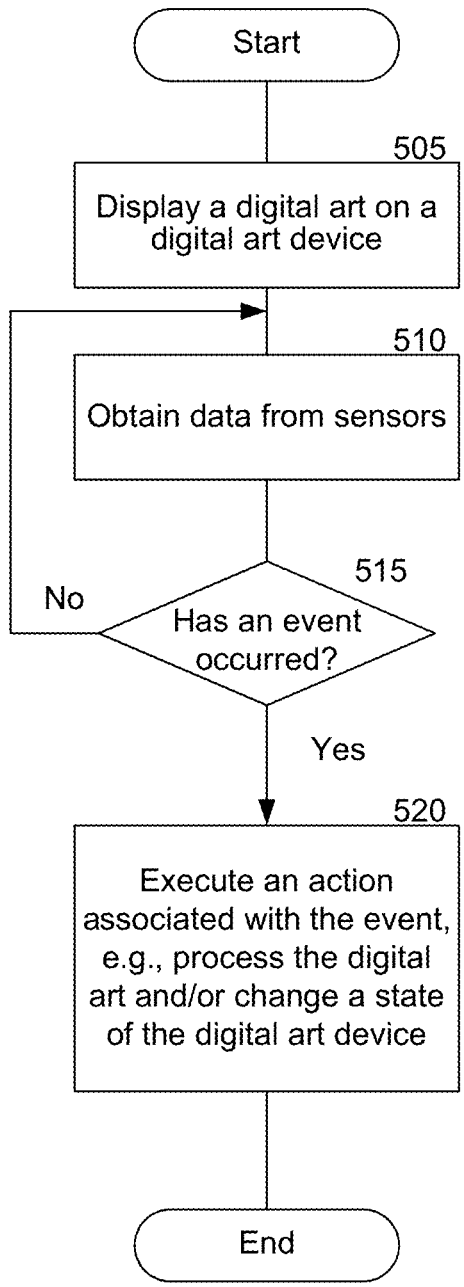
FIG. 5 is a flow diagram of a process of displaying a digital art using a digital art device of FIG. 1, consistent with an embodiment of a disclosed technique.

FIG. 5 is a flow diagram of a process 500 of displaying a digital art using a digital art device of FIG. 1, consistent with an embodiment of a disclosed technique. At block 505, a display module 355 of the digital art device 105 displays a digital art at the digital art device 105, e.g., on a screen of the digital art device 105. In some embodiments, the display module 355 notifies an image retrieving module 340 to retrieve a digital art for displaying. The image retrieving module 340 communicates with the image processing module 350 to determine the digital art to be obtained and obtains the digital art from a storage system, e.g., digital art marketplace 145, a local storage device associated with the digital art device 105.

At block 510, the event generation module 345 obtains data from one or more of the sensors associated with the digital art device 105, e.g., sensors 305-335 of FIG. 3. The event generation module 345 processes the data received from the sensors to determine whether an event has to be generated. For example, if the sensor data indicates that the orientation of the device 105 has changed, a user has performed a gesture, etc., the event generation module 345 generates an event.

At determination block 515, the image processing module 350 determines whether an event is generated. Responsive to a determination that no events are generated, the control transfers to block 510 where the process 500 continues obtain data from the sensors. On the other hand, responsive to a determination that an event is generated, at block 520, the image processing module 350 triggers/executes the action associated with the event. Executing the action associated with the event can include processing the digital art displayed at the digital art device.

In some embodiments, processing the digital art can include transforming the digital art to display a second representation of the digital art from a first representation. In some embodiments, processing the digital art can include transforming the digital art to display a new digital art that is different from the already displayed digital art. For example, for a digital art depicting some fruits placed on a table, consider that for a first orientation, a first representation of the digital art depicts the table in a first position and the fruits in a particular position on the table, and for a second orientation, a second representation of the digital art depicts the table as tilted from the first position and fruits as moved or rolled from the particular position. The artist might have created a single digital art to depict the states at both orientations. For example, if the artist has generated the digital art using CGI techniques, the digital art in a state of the first orientation can be programmed to transform to a state of that of the second orientation upon the occurrence of the event.

In some embodiments, processing the digital art can include retrieving a new digital art from the storage system and displaying the new digital art. Continuing with the above example of the digital art depicting some fruits placed on the table, the digital art for the second orientation can be a digital art different from that of the first orientation, e.g., a digital art depicting a coffee cup. That is, the artist can have created two different digital arts, one for the first orientation and another one for the second orientation.

Further, in some embodiments, executing the action associated with the event can include changing a state of the digital art device. For example, if a gesture event such as a gesture for switching off the device is generated, the action corresponding to the event can be to power off the device 105. In another example, on occurrence of an "idle setting" event, which indicates that no one is present in the room where the device 105 is installed, an action for switching the device 105 to a stand-by mode, a low-power consumption state, or for decreasing he brightness of the screen of the device, etc., can be executed.

The following paragraphs describe examples of various events and actions that can be defined for the digital art device 105.

Power Saving Feature

The device 105 detects when someone is in the room and can alter its behavior accordingly, such as only displaying media when there is someone to view it, or displaying the image in low brightness when there is no one in the room, etc., thereby saving power.

Figure 6:
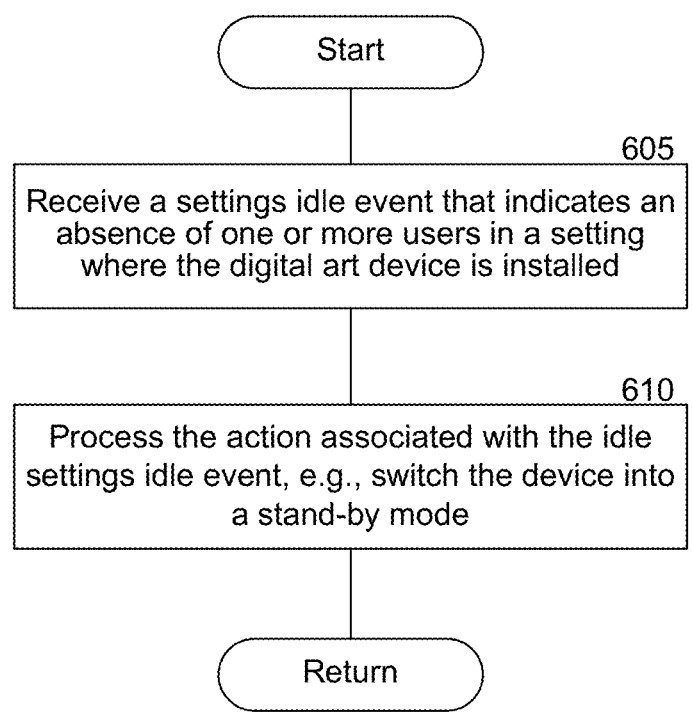
FIG. 6 is a flow diagram of a process of displaying a digital art using a digital art device of FIG. 1, consistent with an embodiment of a disclosed technique.

FIG. 6 is a flow diagram of a process 600 of displaying a digital art using a digital art device of FIG. 1, consistent with an embodiment of a disclosed technique. In some embodiments, the process 600 can be executed as part of the process indicated by blocks 515 and 520 of the process 500 of FIG. 5. At block 605, the image processing module 350 receives a "settings idle" event from the event generation module 345 indicating that there are no people in the setting where the digital art device 105 is installed.

At block 610, the image processing module 350 processes an action associated with the settings idle event. For example, the action can be to switch the device to a low power state, a stand-by mode, or decrease the brightness of the screen. In some embodiments, the low power-state or the stand-by mode can be a mode where a display of the device 105 is turned off and a processor of the device 105 (not illustrated) is put in a low-power consumption mode, some of the sensors are powered off, etc. In another example, the action can be to display a screensaver that blanks the screen of the digital art device 105 or fills it with moving images or patterns.

The event generation module 345 can determine whether there are no people in the settings based on the data received from the sensors. For example, if the cameras of the digital art device 105 do not detect any people in the setting near the digital art device 105, the event generation module 345 can determine that there are no people in the setting, and can generate a settings idle event. A user associated with the digital art device can customize the generation of the settings idle event. For example, the user can define a duration for which the sensors have to detect the absence of people before the event generation module 345 can determine to generate the settings idle event. In another example, the user can also define a specified area in the setting where the sensors have to detect for presence or absence of people for the event generation module 345 to determine whether to generate the settings idle event.

User Identification—Face Recognition/Audio Recognition

Using person identification techniques such as facial recognition, the device 105 can change the contents to suit the interests of the person facing the display of the device 105. The device 105 can store profiles for different users in order to understand image preferences.

Figure 7:
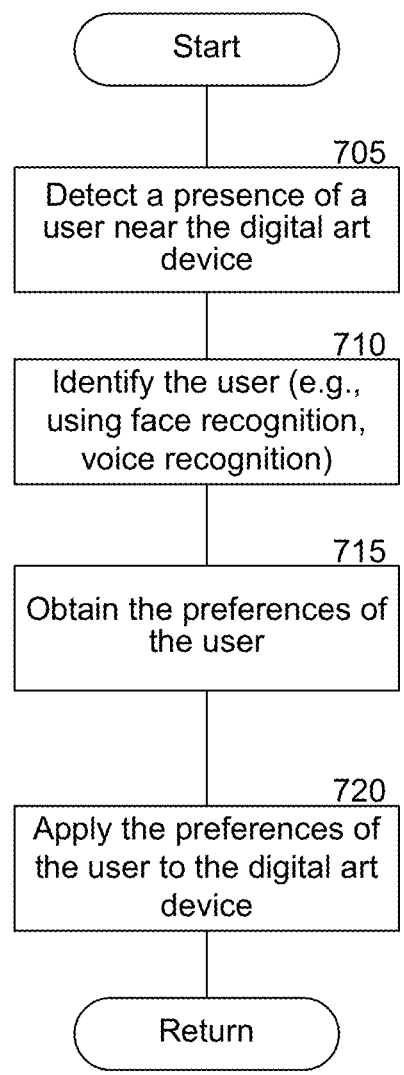
FIG. 7 is a flow diagram of a process of displaying a digital art using a digital art device of FIG. 1, consistent with an embodiment of a disclosed technique.

FIG. 7 is a flow diagram of a process 700 of displaying a digital art using a digital art device of FIG. 1, consistent with an embodiment of a disclosed technique. In some embodiments, the process 700 can be executed as part of the process indicated by blocks 515 and 520 of the process 500 of FIG. 5. At block 705, the image processing module 350 receives a "user identification" event from the event generation module 345 indicating a presence of a user in the proximity of the digital art device 105. In some embodiments, the event generation module 345 determines the presence of the user based on image data of the user received from the face recognition apparatus 305, audio data of the user received from the audio recognition apparatus 320, or other user related data, e.g., biometric data, received from a biometric apparatus 360.

At block 710, the image processing module 350 identifies the user based on the data received from the sensors. For example, the digital art device 105 can maintain user profiles for various users, which includes data necessary for identification of the users and also preferences of each of the users. The image processing module 350 identifies the user by matching the user related data received from the sensors, e.g., image of the face of the user, audio data of the user's voice, retina of the user's eye, fingerprint, with the user profile data.

At block 715, the image processing module 350 obtains the preferences of the user. The preferences can include one or more of the digital arts to be displayed to the user, the type of digital arts to be displayed, the events to be generated, the type of actions to performed for a particular event, a configuration of the digital art device 105, e.g., a particular brightness level of a screen of the device 105, a volume level of the speakers, an orientation of the device 105, etc.

At block 720, the image processing module 350 applies the preferences to the digital art device 105.

Eye-Tracking Technology

Figure 8:
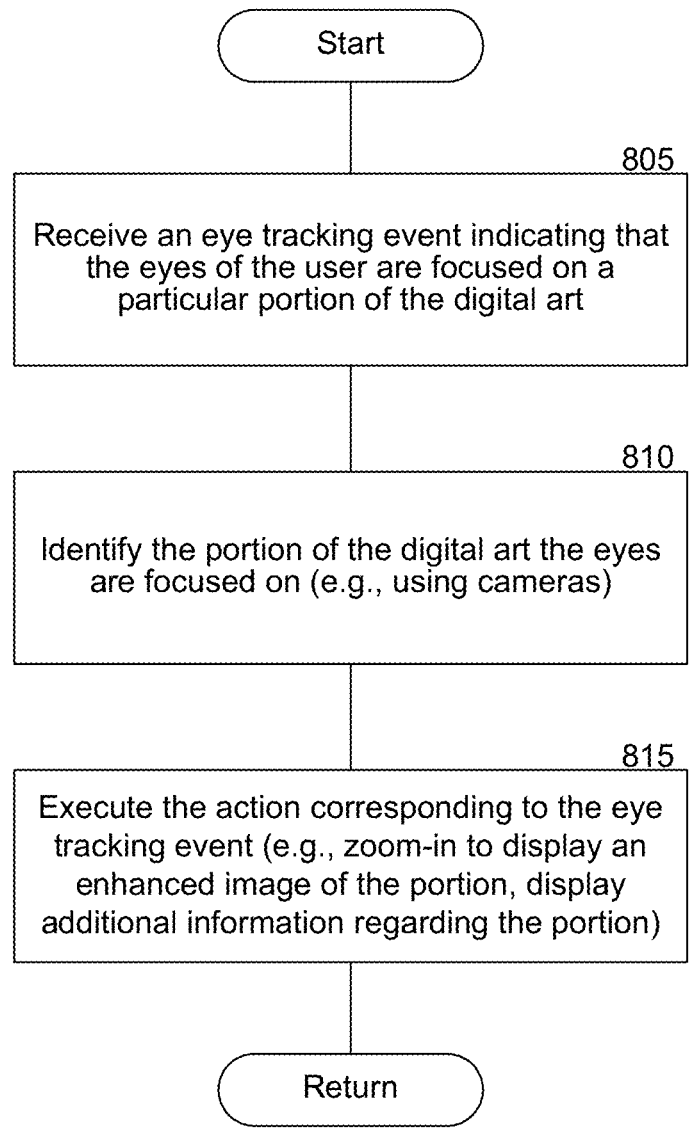
FIG. 8 is a flow diagram of a process of displaying a digital art using a digital art device of FIG. 1, consistent with an embodiment of a disclosed technique.

FIG. 8 is a flow diagram of a process 800 of displaying a digital art using a digital art device of FIG. 1, consistent with an embodiment of a disclosed technique. In some embodiments, the process 800 can be executed as part of the process indicated by blocks 515 and 520 of the process 500 of FIG. 5. At block 805, the image processing module 350 receives an eye tracking event from the event generation module 345 that indicates a portion of the digital art the user is looking at. For example, the cameras can track the eyes of the user and identify the co-ordinates of the digital art device 105 the eyes are focused, which can be further used by the image processing module 350 to determine a portion of the digital art displayed on the digital art device 105 the eyes are focused at.

At block 810, the image processing module 350, determines a portion or a spot in the digital art the eyes of the user are focused at. At block 815, the image processing module 350 executes an action associated with the eye tracking event. The action can be any activity defined for the event, e.g., by an artist who created the digital art. Further, the way in which the digital art is altered or enhanced depends on how the artist who created the digital art wishes to exploit the eye-tracking feature. In some embodiments, the action can be to display additional formation regarding the identified portion. For example, if the person is looking at a watch in the wrist of a person in the digital art, additional details like brand of the watch, can be displayed with the digital art. In some embodiments, the action can be to alter the identified portion of the image, such as enhancing the level of detail in that part of the digital art. For example, by staring at a flower in a landscape depicted in a particular digital art, the flower might blossom. This can be achieved by, for example, retrieving a representation of the particular digital art that has a blossomed flower. Further, when looking at a particular point on the display, the viewer is able to "drill down" into underlying layers, either to show additional textures or details that the artist has embedded.

One artistic possibility is for "one way" animation or "entropic evolution" of the digital art whereby the changes to the digital art are irreversible—there is no reset available. The digital art will change in accordance with where the user has looked and for how long, and the digital art changes can be "randomized" under the artist's control. The device 105 renders a unique digital art that has an "imprint" of the user's gaze and interest. The digital art becomes a unique relationship between the artist and the viewer. Using a combination of viewer-detection and eye-tracking, the digital art can alter its state according to a combination of viewer interests.

Gesture Control

The device 105 allows the user to interact with the device 105 using gesture controls. The device 105 supports the ability for the user to point or look at objects within the digital art displayed on the device 105, such as a vase, a tree or a shape, in order to select them. The device 105 also allows the users to interact with the device 105 to change the behavior or attributes of the device 105. In some embodiments, the gestures include hand-gestures, posture of the body, etc. The gesture recognition apparatus can include a camera such as the one used as eye tracking device.

Figure 9:
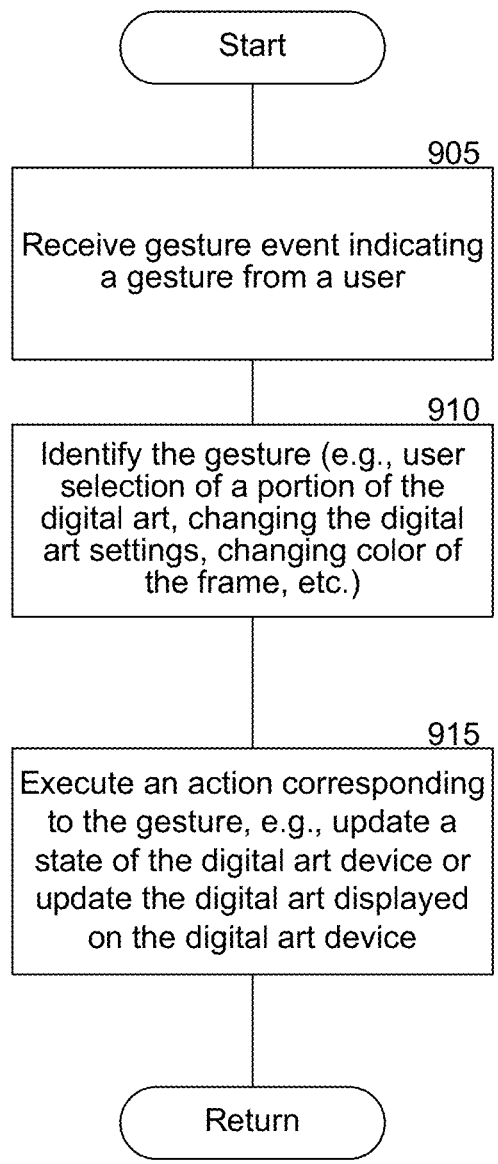
FIG. 9 is a flow diagram of a process of displaying a digital art using a digital art device of FIG. 1, consistent with an embodiment of a disclosed technique.

FIG. 9 is a flow diagram of a process 900 of displaying a digital art using a digital art device of FIG. 1, consistent with an embodiment of a disclosed technique. In some embodiments, the process 900 can be executed as part of the process indicated by blocks 515 and 520 of the process 500 of FIG. 5. At block 905, the image processing module 350 receives a gesture event from the event generation module 345 indicating a gesture from the user. At block 910, the image processing module 350 identifies the gesture. The gesture can include user selection of a portion of the digital art displayed in the device 105, an indication to change the settings of the device 105, an indication to display a next digital art from a set of digital arts, etc.

At block 915, the image processing module 350 executes an action corresponding to the gesture event. In some embodiments, the gesture can be an indication to update the state of the digital art device. For example, the gesture can be an indication to change the brightness of the screen of the device 105, for which the corresponding action can be to update the brightness. Accordingly, when the action is executed, the image processing module 350 can update the brightness of the screen.

In some embodiments, the gesture can be a user selection of a portion of the digital art displayed on the device 105. After the user has selected the portion, a number of actions can be performed, e.g., displaying additional information regarding the selected portion, searching for other digital arts that match the selected portion. As described above, an action performed for the event can be any action that is defined for the event, e.g., by an artist of the digital art, the user of the digital art device 105. For example, after the user has selected an object in the digital art, the user can then request the device 105 to show more digital arts with similar objects, using the selected objected in the digital art as a means to search various sources, e.g., database 120, to find a new digital art. The objects in the image are automatically detected using, for example, pattern recognition software and are used to create an "object mask" over the image.

Searching

The criteria for determining a match between two digital arts or a portion of thereof can be defined in many ways. In some embodiments, a match is determined based on one or more colors of the digital arts, a shape of the digital arts, a category the digital arts are classified into, a name of the artist of the digital arts, a theme, a concept, an occasion or a mood depicted by the digital arts, etc. For example, two digital arts can be determined to match if one or more of their colors are the same or similar (the artist or even the user can define the criteria for determining if two colors are similar). In another example, two digital arts can be determined to match if they are classified into the same category, e.g., abstract art. The criteria for determining the match can be defined by various entities, e.g., the artist, the user of the device 105. In some embodiments, a third party such as interior decorators can be hired to define the matching criteria for matching the digital arts.

The user can use his or her finger to draw shapes or paint using various colors on a blank canvas displayed in the device 105, and then use these to search various sources, e.g., the database 120, for digital arts with a similar shape or color scheme. For example, the user could create an orange streak and then a black box and request the digital art player app 135 on the device 105 to search for images with similar shapes or colors. Further, the digital art player app 135 can also support "literal" searching. For example, the user can draw what he/she believes to be hills with trees and the sun in a particular position. The digital art player app 135 then searches for digital arts that seem to literally match the configuration, that is, the sun in the position shown, the hills and so on. The digital art player app 135 can also be used for "shape-based" search, such as the vase example above (all digital arts with vases). The digital art player app 135 can also be used in an "inspiration mode" where the orange/black lines mentioned earlier represent the user's intent to find something with orange and black lines, no matter what that image might be. In the inspiration mode, the user can request different color palettes on the display and use these to search for digital arts with similar palettes.

In some embodiments, the digital art player app 135 facilitates searching for digital arts based on a mood of the person. The applications, e.g., the digital art creator app 215, the digital art player app 135, enable an artist or other users to associate a digital art with one or more of the moods from a mood dictionary, e.g., calm, bold, happy, busy, party. The mood dictionary is generated and updated regularly based on data like user-preferences of digital art for particular moods, mood description, association of colors to a particular mood, data from other sources such as décor books, interior design books, etc.

It should be noted that while the digital art player app 135 facilitates searching of digital arts, the search is not restricted to digital arts. The digital art player app 135 can also facilitate searching for non-digital arts. The colors in the non-digital art images can be automatically determined using known color recognition techniques. The objects in the non-digital art images can be automatically detected using, for example, pattern recognition software.

Audio-Recognition

Figure 10:
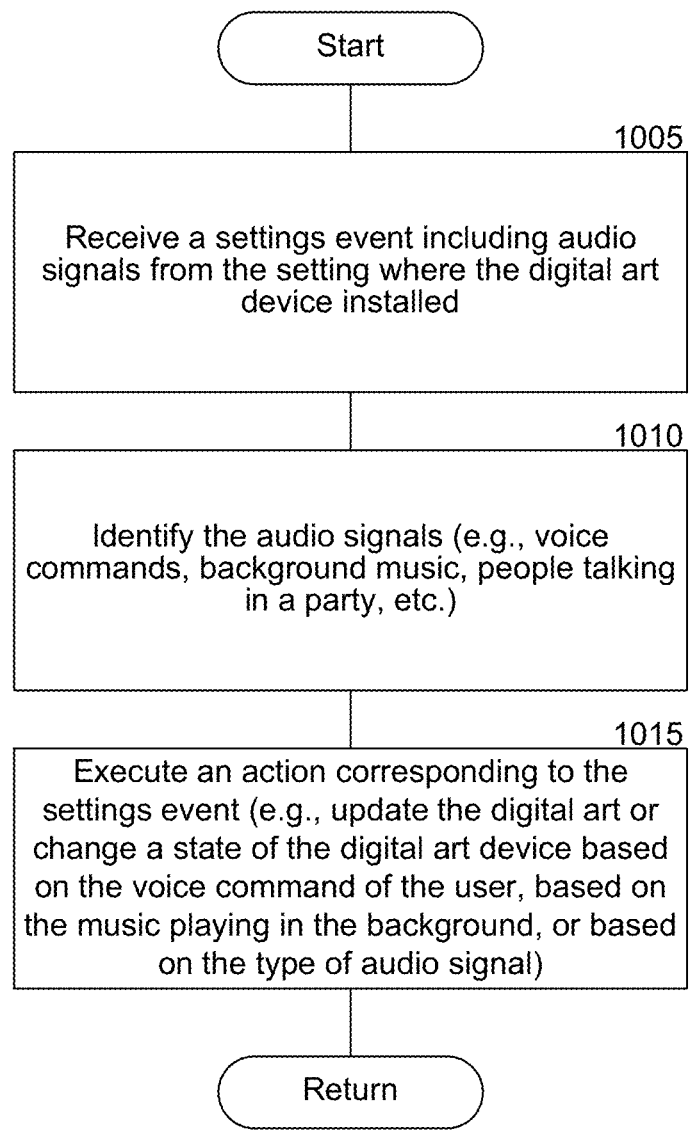
FIG. 10 is a flow diagram of a process of displaying a digital art using a digital art device of FIG. 1, consistent with an embodiment of a disclosed technique.

FIG. 10 is a flow diagram of a process 1000 of displaying a digital art using a digital art device of FIG. 1, consistent with an embodiment of a disclosed technique. In some embodiments, the process 1000 can be executed as part of the process indicated by blocks 515 and 520 of the process 500 of FIG. 5. At block 1005, the image processing module 350 receives a settings event from the event generation module 345 including audio data of the setting received from the audio recognition apparatus 320.

At block 1010, the image processing module 350 identifies the audio data. The audio data can include voice commands of the user, music playing in the setting, people talking in a party, sound or ambient noise in the setting, etc.

At block 1015, the image processing module 350 executes an action corresponding to the settings event. Executing the action associated with the settings event can include processing the digital art displayed at the digital art device 105 or changing a state of the digital art device based on the audio data received from the setting.

In some embodiments, processing the digital art can include transforming a first representation of the digital art that is displayed to a second representation of the digital art and displaying the second representation. In some embodiments, processing the digital art can include retrieving a new digital from the storage system and displaying the new digital art. For example, if the audio data indicates a party atmosphere or gathering of people, then the action can be to display a new digital art or change the representation of the digital art displayed at the device 105 that is more relevant to a party. In another example, if the audio data indicates shouting in the room, such as might emit from an argument, the action can be to display digital arts that are more "soothing." In some embodiments, the image processing module 350 can identify the type of audio data using a sound analysis apparatus. The device 105 can respond to voice commands to alter its contents. For example, the user can issue a voice command to display a specified digital art from a specified artist and the image processing module 350 executes an action to display the specified digital art at the device 105.

Referring back to executing the action corresponding to the settings event in block 915, in some embodiments, executing the action associated with the event can include changing a state of the digital art device. For example, if the user issues a voice command for switching off the device, the action corresponding to the event can be to power off the device 105. In another example, if the audio data indicates a party, the action can be to change a color of the frame of the device 105 to a color that is more relevant to a party. An entity, e.g., the user of the device 105, an artist of a digital art, or a third party such as interior décorators can classify various arts, colors into different categories, themes, occasions, etc., which can be stored at a storage system accessible by the device 105, e.g., database 120, local storage device of the device 105.

Intensity of Light

Figure 11:
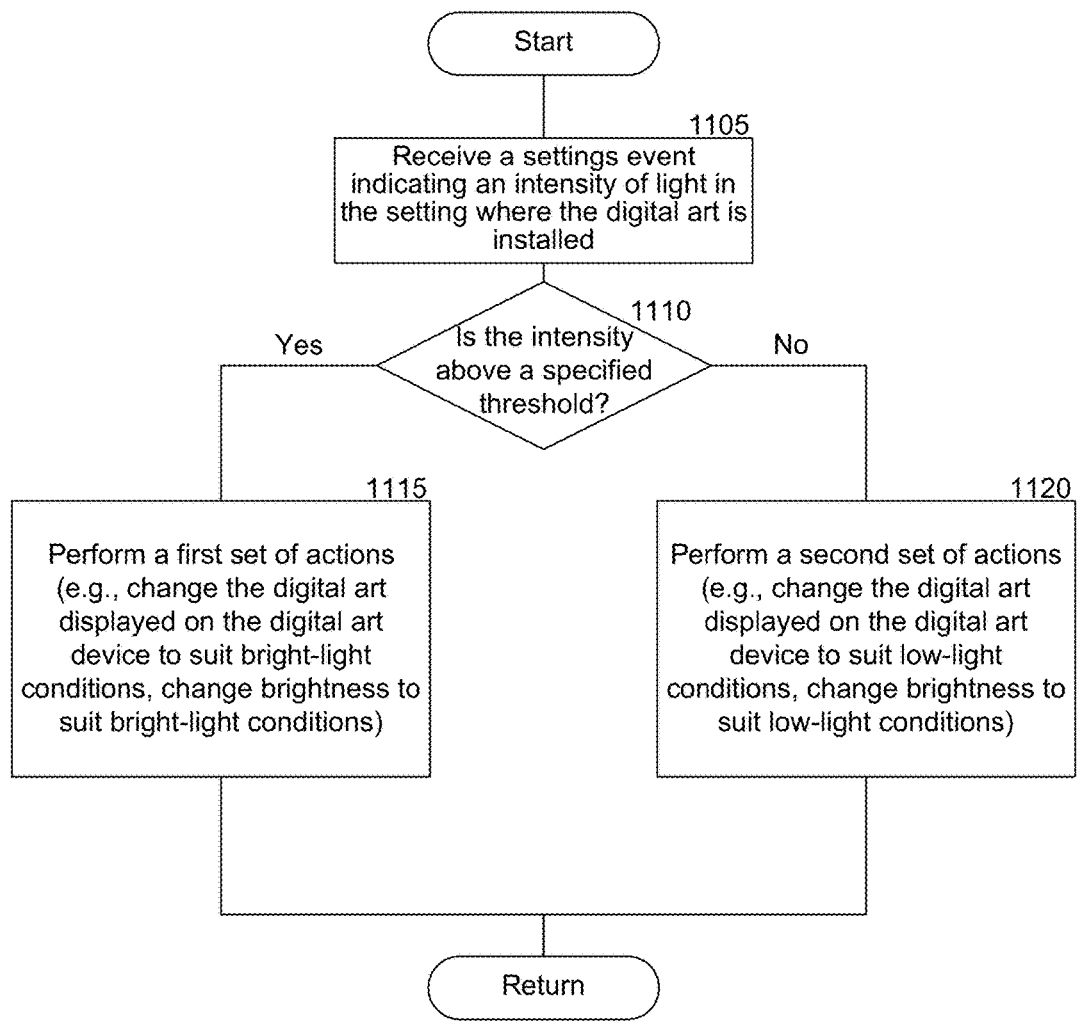
FIG. 11 is a flow diagram of a process of displaying a digital art using a digital art device of FIG. 1, consistent with an embodiment of a disclosed technique.

The device 105 can alter the digital art according to the lighting levels and conditions in the setting where the device 105 is installed. The device 105 can achieve this using the light intensity detection apparatus 330. FIG. 11 is a flow diagram of a process 1100 of displaying a digital art using a digital art device of FIG. 1, consistent with an embodiment of a disclosed technique. In some embodiments, the process 1100 can be executed as part of the process indicated by blocks 515 and 520 of the process 500 of FIG. 5. At block 1105, the image processing module 350 receives a settings event from the event generation module 345 including data regarding the intensity of light in the setting.

At block 1110, the image processing module 350 determines whether the intensity of light exceeds a specified threshold. Responsive to a determination that the intensity of light is above the specified threshold, at block 1115, the image processing module 350 executes a first action associated with the settings event. On the other hand, responsive to a determination that the intensity of light is below the specified threshold, at block 1120, the image processing module 350 executes a second action associated with the settings event. Executing the first action or the second action can include updating the digital art displayed in the device 105 and/or changing a state of the device 105 based on the intensity of light. For example, the intensity of light in a setting can change upon sunrise and/or sunset or during the day, and the device 105 can be configured to display different digital arts or different representations of a digital art at different times of the day as the day progresses. For example, a first representation of a particular digital art depicting sunrise in the background of mountains and light blue colored sky can be displayed upon sunrise. Similarly, upon sunset, a second representation of the particular digital art depicting a moon in the background of mountains and black sky can be displayed. The device 105 can be configured to display a digital art that is more appropriate to be displayed during the day, when the light is above a specified threshold, and automatically switch to another digital art during the night. The device 105 can also be configured to display different digital arts for different light intensity ranges.

Further, the properties of the device 105 can also be changed based on the lighting conditions. For example, the device 105 can be configured to increase the brightness of the screen during the day and decrease during the night.

Color-Recognition

The device 105 can alter the digital art displayed on the device 105 to match the colors of the surrounding décor accessories in the setting where the device 105 is installed. For example, in an orange room, the digital arts to be displayed on the device 105 incorporate orange tints in the color palette. The device 105 can achieve this using the color-recognition apparatus 310.

Figure 12:
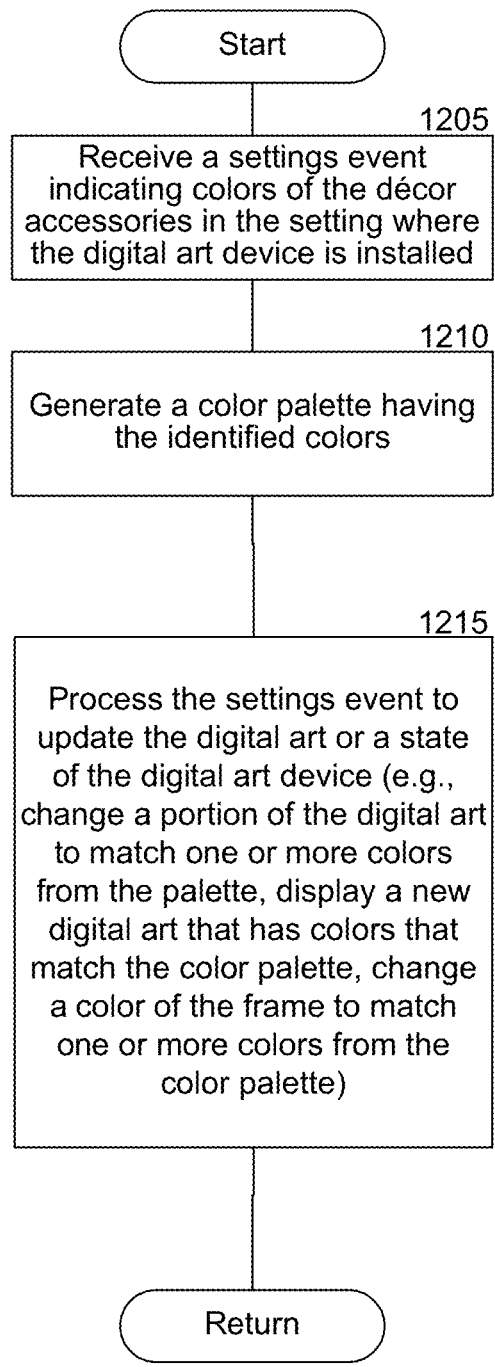
FIG. 12 is a flow diagram of a process of displaying a digital art using a digital art device of FIG. 1, consistent with an embodiment of a disclosed technique.

FIG. 12 is a flow diagram of a process 1200 of displaying a digital art using a digital art device of FIG. 1, consistent with an embodiment of a disclosed technique. In some embodiments, the process 1200 can be executed as part of the process indicated by blocks 515 and 520 of the process 500 of FIG. 5. At block 1205, the image processing module 350 receives a settings event from the event generation module 345 including data regarding colors of the décor accessories in the setting.

At block 1210, the image processing module 350 generates a color palette of the décor accessories.

At block 1215, the image processing module 350 executes an action corresponding to the settings event. Executing the action can include updating the digital art displayed in the device 105 to include one or more colors from the color palette and/or changing a state of the device 105 based on the color palette. The user can select one or more colors from the color palette and request the device 105 to display the digital art or change the state of the device 105 based on the selected colors. For example, if the wall of the room where the device 105 is installed on includes an orange color, the image processing module 350 alters/transforms the digital art displayed on the digital art device 105 to include an orange color or that contrasts with the orange color or that is similar to the orange color. In some embodiments, instead of altering the already displayed digital art, the image processing module 350 can display a new digital art that matches with one or more colors of the décor accessories of the setting. Further, when searching for digital arts, the user can then select colors from the palette in order to find images with those colors.

In another example, the image processing module 350 can change a color of the frame of the digital art device 105 based on the color palette. For example, the color of frame can be changed to match or contrast with the color of the wall, a closet near the device 105, etc.

Orientation Detection

Figure 13:
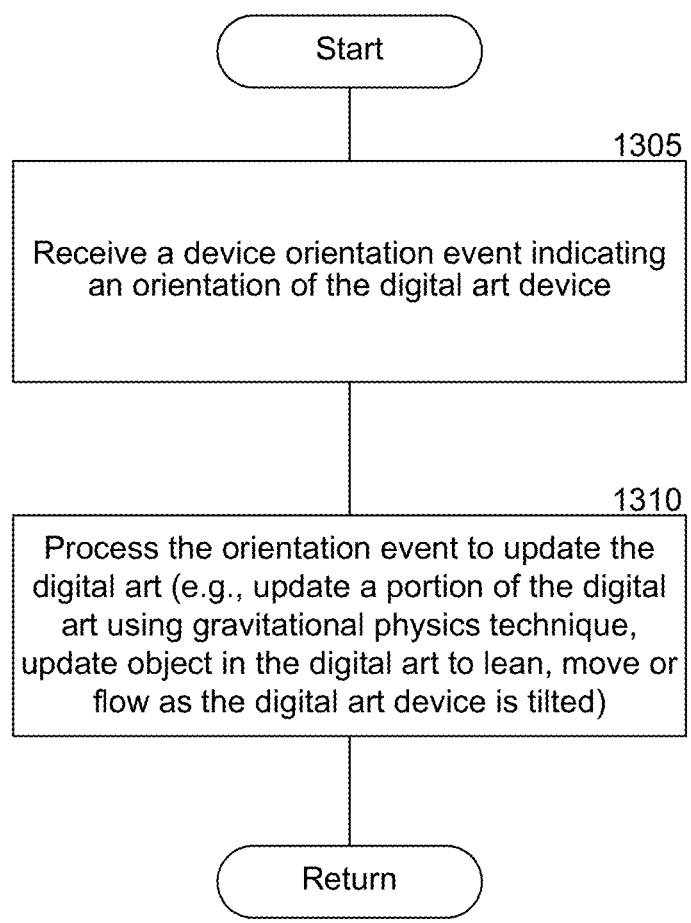
FIG. 13 is a flow diagram of a process of displaying a digital art using a digital art device of FIG. 1, consistent with an embodiment of a disclosed technique.

The device 105 can detect the orientation of the device using the orientation detection apparatus 325, and alter the digital art displayed in the device based on the orientations. FIG. 13 is a flow diagram of a process 1300 of displaying a digital art using a digital art device of FIG. 1, consistent with an embodiment of a disclosed technique. In some embodiments, the process 1300 can be executed as part of the process indicated by blocks 515 and 520 of the process 500 of FIG. 5. At block 1305, the image processing module 350 receives an orientation event indicating an orientation of the device 105.

At block 1310, the image processing module 350 processes the orientation event by executing action corresponding to the orientation event. Executing the action can include transforming the digital art displayed in the device 105 based on the orientation of the device 105, e.g., displaying the appropriate representations of the digital art. The digital art can include various representations for various orientations. For example, if the device 105 is tilted slightly, objects in a digital art would lean, fall or shift towards the downward slope, a fruit would move to one side of a basket, books would lean on a shelf, or a fish on a hook. In some embodiments, such effects can be achieved using gravitational physics techniques. Some digital arts can transform through 360 degrees, for example, a person's hair hanging "upwards" when the device 105 is tilted upside down.

Real-Play

The device provides a feature referred to as "real play," where art files that contain a digital record of all the brush strokes, or other artist tools, are played as a media file in order to reveal how the artist constructed the image to the smallest detail (pen stroke, brush flick etc.) right from scratch. For example, the user can watch the image being constructed as the artist constructed it, stroke-by-stroke, and pixel-by-pixel. This is not a time-lapse video or a replay of the artist creating the picture. In an embodiment, each "vector" stroke of the pen, including erasers, is stored. In addition to "time lapse" replay, a potential exists to watch a new piece of art being created in real time, that is, as the artist draws it. This might take place over hours, days, weeks or even months.

Figure 14:
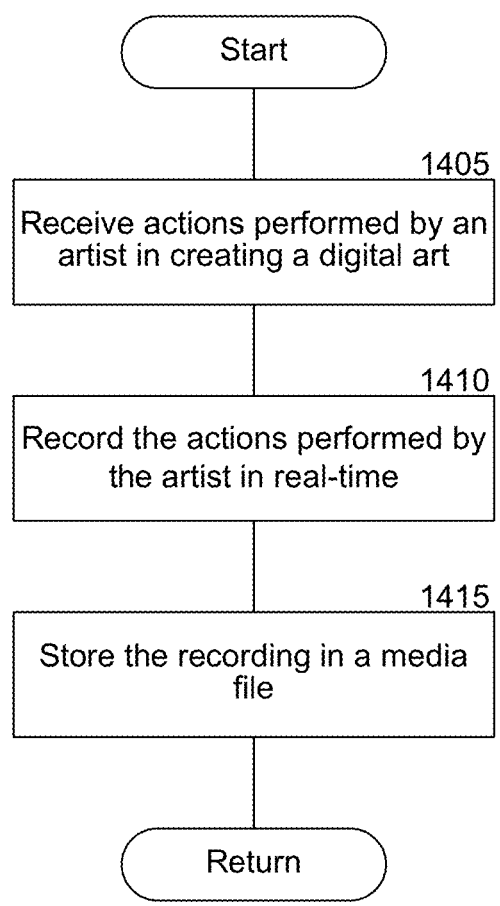
FIG. 14 is a flow diagram of a process of generating a real-play media file for a digital art, consistent with an embodiment of a disclosed technique.

FIG. 14 is a flow diagram of a process 1400 of generating a real-play media file for a digital art, consistent with an embodiment of a disclosed technique. In some embodiments, the process 1400 can be executed in the environment of FIG. 1. At block 1405, the image processing module 350 receives actions performed by the artist in generating a digital art, e.g., paint brush strokes. At block 1410, the image processing module 350 records the actions performed by the artist in real-time, e.g., each "vector" stroke of the pen, including erasers, or other artist tools that the artist uses. At block 1415, the image processing module 350 stores the recording a media file. The media file will be of a specific format, e.g., of a format that can be played on the device 105, and includes all the actions performed by the artist in generating the digital art.

It should be noted that the creation of the media file is not restricted to the digital art device 105, and that the media files can be generated on other user devices such as a desktop, a laptop, a smartphone, a tablet, etc., using supporting applications, e.g., digital art creator apps 215 that implement the above described functionality of the image processing module.

Real-Time Updates

The device 105 can receive real-time updates via a wireless connection to the internet. For example, if the user has subscribed to a particular artist, the device 105 may display digital arts from the artist as and when the artist publishes the new digital arts. The device 105 can also receive any commands from the user wirelessly.

Multi-Screen Display

In an embodiment, multiple digital art devices can be grouped on the wall to produce multi-screen displays, enabling a digital art to be shared across devices or a collection of matching digital arts to be shown. The digital arts to be displayed on the multiple screens in the multi-screen installation can be produced by the same artist, created specifically for multi-screen installations, or can be from different artists. In a multi-screen display, when adding a second device, the first device(s) automatically detects the newly added second device in the room and automatically adapts the image(s) to be displayed on the multiple devices including the second device.

Mobile-Device Integration

The device 105 can also be controlled using mobile devices such as a smartphone, mobile phone, tablet computers, laptops, etc. For example, the user can control the device using an app on a smartphone or a tablet. For example, whilst out on a journey, the user might see an image of interest and take a picture using the smartphone camera. Upon return, the user can buy and request the image on their device 105 using an image-based search. Using an app on a smartphone or tablet, the user can move or cause the digital art displayed on the smartphone image to be displayed on the display of the device 105.

The user can hold their smartphone or tablet in front of the wall image and get a different view of that part of the image, that is, like a magnified or portal view into the larger art. This could include "X-ray" effects to look at objects hidden in the image.

Other features

Using transparent display technology, art can be incorporated into windows or mirrors. The art incorporated into windows can be used to transform the view from or into a room. Using cameras and appropriate software, "self-portraits" could be incorporated into mirror images or even wall décor. The self-portrait images could be animated, for example, using gaming engine technology to create all kinds of interesting possibilities, such as reflections that talk back.

In some embodiments, the device 105 is capable of showing digital arts that are larger than the physical size of the screen of the device 105. This could be used to show long-format landscape images that scroll left or right across the screen, either under user control or artist control.

In some embodiments, the device 105 can alter the digital art according to the temperature in the setting where the device 105 is installed. The device 105 can achieve this using the temperature detection apparatus 335. For example, if the temperature is below a specified threshold, e.g., below 40 degree Fahrenheit, the device 105 can be configured to show a digital art depicting a bright sunny landscape to give a soothing effect to the user. In another example, if the temperature is exceeds a specified threshold, e.g., above 100 degree Fahrenheit, the device 105 can be configured to show a digital art depicting a snow mountain.

Example Processing System

Figure 15:
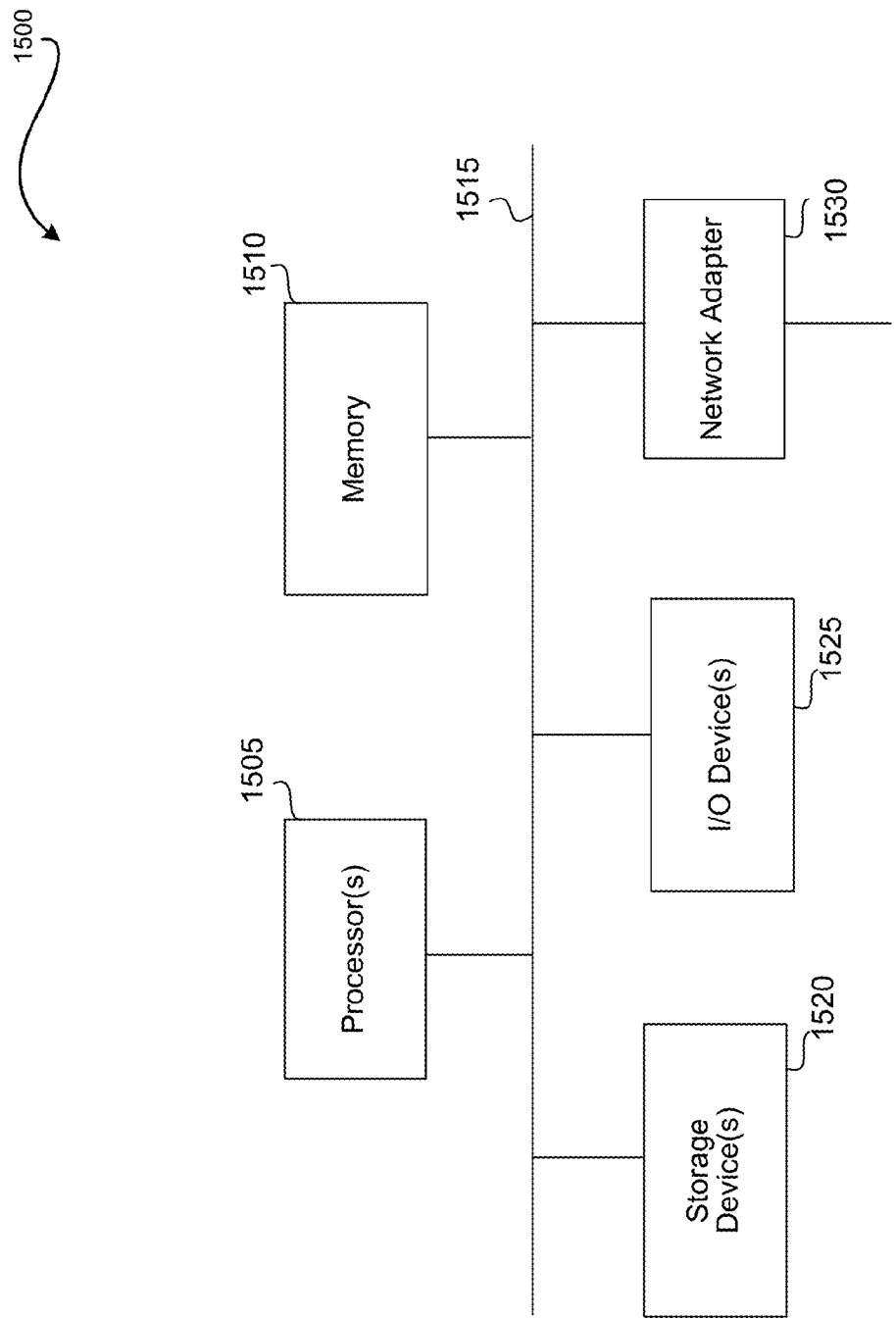
FIG. 15 is a block diagram of a computer system as may be used to implement features of some embodiments.

FIG. 15 is a block diagram of a computer system or a processing system as may be used to implement features of some embodiments. The computer system may perform various operations disclosed above, and store various information generated and/or used by such operations. The processing system 1500 is a hardware device on which any of the entities, components or services depicted in the examples of FIGS. 1-14 (and any other components described in this specification), such as digital art device 105, sensors on device 105 such as face recognition apparatus 305, gesture recognition apparatus 315, server 115, client devices 125, décor discovery tool 220, etc., can be implemented. The processing system 1500 includes one or more processors 1505 and memory 1510 coupled to an interconnect 1515. The interconnect 1515 is shown as an abstraction that represents any one or more separate physical buses, point to point connections, or both connected by appropriate bridges, adapters, or controllers. The interconnect 1515, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

The processor(s) 1505 is/are the central processing unit (CPU) of the processing system 1500 and, thus, control the overall operation of the processing system 1500. In certain embodiments, the processor(s) 1505 accomplish this by executing software or firmware stored in memory 1510. The processor(s) 1505 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 1510 is or includes the main memory of the processing system 1500. The memory 1510 represents any form of random access memory (RAM), read-only memory (ROM), flash memory, or the like, or a combination of such devices. In use, the memory 1510 may contain a code. In one embodiment, the code includes a general programming module configured to recognize the general-purpose program received via the computer bus interface, and prepare the general-purpose program for execution at the processor. In another embodiment, the general programming module may be implemented using hardware circuitry such as ASICs, PLDs, or field-programmable gate arrays (FPGAs).

Also connected to the processor(s) 1505 through the interconnect 1515 are a network adapter 1530, a storage device(s) 1520 and I/O device(s) 1525. The network adapter 1530 provides the processing system 1500 with the ability to communicate with remote devices, over a network and may be, for example, an Ethernet adapter or Fibre Channel adapter. The network adapter 1530 may also provide the processing system 1500 with the ability to communicate with other computers within the cluster. In some embodiments, the processing system 1500 may use more than one network adapter to deal with the communications within and outside of the cluster separately.

The I/O device(s) 1525 can include, for example, a keyboard, a mouse or other pointing device, disk drives, printers, a scanner, and other input and/or output devices, including a display device. The display device can include, for example, a cathode ray tube (CRT), liquid crystal display (LCD), or some other applicable known or convenient display device.

The code stored in memory 1510 can be implemented as software and/or firmware to program the processor(s) 1505 to carry out actions described above. In certain embodiments, such software or firmware may be initially provided to the processing system 1500 by downloading it from a remote system through the processing system 1500 (e.g., via network adapter 1530).

The techniques introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine.

A machine can also be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

A machine-accessible storage medium or a storage device(s) 1520 includes, for example, recordable/non-recordable media (e.g., ROM; RAM; magnetic disk storage media; optical storage media; flash memory devices; etc.), etc., or any combination thereof. The storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state.

The term "logic", as used herein, can include, for example, programmable circuitry programmed with specific software and/or firmware, special-purpose hardwired circuitry, or a combination thereof.

Although the present invention has been described with reference to specific exemplary embodiments, it will be recognized that the invention is not limited to the embodiments described, but can be practiced with modification and alteration within the spirit and scope of the embodiments described. Accordingly, the specification and drawings are to be regarded in an illustrative sense rather than a restrictive sense.

We claim:

1. A digital art device, comprising:
   a processor;
   an image generation module to generate a first graphical user interface (GUI) on a digital art device that enables a first user to:
      create a first digital art on the digital art device,
      associate the first digital art with a set of events, and
      associate the first digital art with a set of actions that are triggered on an occurrence of one or more of the set of events, wherein each action from the set of actions modifies the first digital art or a state of the digital art device;
   a display module to display a digital art, the digital art including a plurality of actions that transform the digital art to generate a second digital art, the plurality of actions triggered based on one or more events;
   a plurality of sensors to generate sensor data including data regarding one or more attributes of the digital art device;
   an event generation module to generate the one or more events based on the sensor data; and
   an image processing module to process the digital art based on one or more of the actions triggered by the one or more events to generate the second digital art.

2. The digital art device of claim 1, wherein the sensor data includes orientation data that indicates an orientation of the digital art device in the setting.

3. The digital art device of claim 2, wherein the event generation module is configured to generate an orientation event of the one or more events, the orientation event identifying a change in the orientation of the digital art device based on the orientation data, and wherein the image processing module triggers a first action of the actions corresponding to the orientation event to transform the digital art to the second digital art.

4. The digital art device of claim 3, wherein the image processing module is configured to alter, as part of the first action, a state of the digital art in response to the orientation event to generate the second digital art.

5. The digital art device of claim 4, wherein the image processing module is configured to alter the state of the digital art by changing an orientation of one or more objects displayed in the digital art.

6. The digital art device of claim 1, wherein the image generation module is further configured to generate a media file that includes a real-time digital recording of a plurality of actions performed by the first user in generating the first digital art.

7. The digital art device of claim 1, wherein the image processing module is further configured to play a media file that includes a real-time digital recording of a plurality of actions performed by the first user in generating the digital art.

8. The digital art device of claim 1 further comprising:
   a frame that surrounds one or more of a plurality of sides of the digital art device,
      wherein the frame is made of an electronic display material.

9. The digital art device of claim 8, wherein the electronic display material includes at least one of a light emitting diode (LED), an electronic paper, a bio luminescence material or a chemical luminescence material.

10. The digital art device of claim 8, wherein the image processing module is further configured to change a color of the frame to match one or more colors of a plurality of décor accessories in the setting.

11. The digital art device of claim 8, wherein the image processing module is further configured to change a color of the frame to match one or more colors of the digital art.

12. The digital art device of claim 8, wherein the image processing module is further configured to change a color of the frame to a color specified by the first user.

13. The digital art device of claim 1, wherein the one or more events and the actions performed on the digital art based on the one or more events are defined by at least one of a digital art provider who created the digital art or a user associated with the digital art device.

14. The digital art device of claim 1, wherein the plurality of sensors includes one or more cameras.

15. The digital art device of claim 1, wherein the plurality of sensors includes a photometer.

16. The digital art device of claim 1, wherein the plurality of sensors includes a gyroscope.

17. The digital art device of claim 1, wherein the plurality of sensors includes a microphone.

18. The digital art device of claim 1, wherein the plurality of sensors includes a thermometer.

19. A method, comprising:
generating a first graphical user interface (GUI) on a digital art device that enables a user associated with the digital art device to:
create a digital art on the digital art device,
associate the digital art with a plurality of events, and
associate the digital art with a plurality of actions that are triggered on an occurrence of one or more of the events, wherein each of the actions modify a state of the digital art device or transform the digital art to generate a second digital art, the digital art device installed in a setting;
displaying the digital art on the digital art device;
receiving sensor data from a plurality of sensors associated with the digital art device, the sensor data including data regarding a plurality of attributes of the digital art device;
determining an occurrence of a first event of the one or more events based on the sensor data; and
executing a first action of the actions corresponding to the first event, the first action transforming the digital art to a second digital art or altering a state of the digital art device as defined by the first action.

20. The method of claim 19, wherein executing the first action to alter the state of the digital art device includes switching the digital art device to a low power state.

21. The method of claim 19, wherein receiving sensor data from the sensors includes:
receiving data indicating an orientation of the digital art device, and
generating the first event indicating a change in the orientation of the digital art device from a first orientation to a second orientation.

22. The method of claim 21, wherein executing the first action includes altering the digital art to generate the second digital art corresponding to the second orientation.

23. The method of claim 22, wherein altering the digital art to generate the second digital art includes processing the digital art using a gravitational physics technique to change a state of one or more contents of the digital art.

24. The method of claim 19 further comprising:
presenting a recording application that is configured to:
record, in real-time, a plurality of actions performed by a first user in creating the digital art, and
generate a media file to store the plurality of actions.

25. The method of claim 19 further comprising:
presenting a player application that is configured to play a media file containing a recording of a plurality of actions performed by a first user in creating the digital art, wherein the media file, when played, causes the digital art device to display the creation of the digital art in a sequence the plurality of actions were performed by the first user in creating the digital art.

26. The method of claim 19 further comprising:
determining, by the digital art device, that a second digital art device is added to a multi-screen display system the digital art device is a part of, the multi-screen display system including a plurality of digital art devices, wherein at least a set of the digital art devices is configured to display distinct portions of the digital art; and
sending an instruction to the second digital art device to display a third digital art, the third digital art being related to the digital art displayed in the digital art device.

27. The method of claim 19 further comprising:
determining, by the digital art device, that the digital art device is part of a multi-screen display system having a plurality of digital art devices;
identifying a set of the digital art devices to share the digital art with; and
sending an instruction to the set of the digital art devices to display distinct portions of the digital art, the set of the digital art devices arranged in a specified pattern, wherein, when the distinct portions are viewed together, appear as the digital art.

28. A computer-readable storage medium storing computer-readable instructions, comprising:
instructions for generating a first graphical user interface (GUI) on a digital art device that enables a user to create a digital art, wherein the digital art is associated with a plurality of events and a plurality of actions that are triggered on an occurrence of the plurality of events, wherein each of the actions modify the digital art or a state of the digital art device;
instructions for displaying the digital art on the digital art device;
instructions for receiving, from a plurality of sensors associated with the digital art device, sensor data including a plurality of attributes of the digital art device;
instructions for generating a first event of the events based on the sensor data; and
instructions for executing a first action of the actions corresponding to the first event.

29. The computer-readable storage medium of claim 28, wherein the instructions for altering the state of the digital art device includes switching the digital art device to a low power state.

30. The computer-readable storage medium of claim 28, wherein the instructions for receiving sensor data from the sensors includes:
instructions for receiving data indicating an orientation of the digital art device, and
instructions for generating the first event indicating a change in the orientation of the digital art device from a first orientation to a second orientation.

31. The computer-readable storage medium of claim 30, wherein the instructions for executing the first action includes instructions for altering the digital art to generate a second digital art corresponding to the second orientation.

32. The computer-readable storage medium of claim 31, wherein altering the digital art to generate the second digital art includes processing the digital art using a gravitational physics technique to change a state of one or more contents of the digital art.

* * * * *